(12) United States Patent
Berg

(10) Patent No.: US 6,498,701 B1
(45) Date of Patent: Dec. 24, 2002

(54) METHOD OF CHANNELING ACCUMULATED DISC LUBE OFF OF RECORDING HEAD SLIDERS

(75) Inventor: Lowell James Berg, Eden Prairie, MN (US)

(73) Assignee: Seagate Technology LLP, Scotts Valley, CA (US)

( * ) Notice: Subject to any disclaimer, the term of this patent is extended or adjusted under 35 U.S.C. 154(b) by 80 days.

(21) Appl. No.: 09/658,845

(22) Filed: Sep. 11, 2000

Related U.S. Application Data

(60) Provisional application No. 60/191,817, filed on Mar. 24, 2000.

(51) Int. Cl.$^7$ .............................................. G11B 5/60
(52) U.S. Cl. ............................... 360/235.4; 360/236.5; 360/237
(58) Field of Search ...................... 360/235.4, 235.7, 360/236.2, 236.3, 236.5, 236.9, 237

(56) References Cited

U.S. PATENT DOCUMENTS

| | | | |
|---|---|---|---|
| 5,751,517 A | * | 5/1998 | Agarwal ..................... 360/237 |
| 5,853,959 A | * | 12/1998 | Brand et al. ................. 430/320 |
| 5,973,880 A | * | 10/1999 | Hashimoto et al. ......... 360/236.2 |
| 6,055,127 A | | 4/2000 | Boutaghou et al. ......... 360/103 |
| 6,212,042 B1 | * | 4/2001 | Gui et al. .................. 360/236.6 |
| 6,292,323 B1 | * | 9/2001 | Tanaka et al. ............... 360/75 |

FOREIGN PATENT DOCUMENTS

JP        10-11730     *  1/1998

* cited by examiner

Primary Examiner—Jefferson Evans
(74) Attorney, Agent, or Firm—Moser, Patterson & Sheridan LLP

(57) ABSTRACT

A method and system is presented for a slider positioned to control a flow of lubricant over the slider body. The slider can also include a raised rail. A pad can be positioned on the slider between the raised rail and a trailing edge of the slider. The pad can extend to the trailing edge of the slider. The pad can include at least two separated edges, which form a central channel. The pad can be made of carbon. The pads can be approximately 0.03 micron tall in a cavity that is approximately 2 micro deep. The pad can be angled in relation to an air flow across the slider to control lube.

20 Claims, 4 Drawing Sheets

METHOD OF CHANNELING ACCUMULATED DISC LUBE OFF OF RECORDING HEAD SLIDERS

CROSS-REFERENCE TO RELATED APPLICATION(S)

This application claims the benefit of the filing date of U.S. provisional application serial No. 60/191,817 entitled "A Method of Channeling Accumulated Disc Lube off of Recording Head Sliders," which was filed on Mar. 24, 2000.

BACKGROUND

In modern high speed disc drives, the recording head slider is usually maintained at a very small distance above the recording media. Typically, this distance is 25 nm. The disc is lubricated to improve its durability. Modern discs usually use a long chain polymer lubricant.

When disc heads fly over the disc for long periods of time, disc lube can accumulate on the slider. Once the disc drive is shut down and the disc stops spinning, the slider with the accumulated lube is parked on the disc. The accumulated lube transfers from the slider to the disc and can be held at the slider/disc interface by meniscus forces. This large amount of disc lubricant at the slider/disc interface may be responsible for the high stiction forces observed between slider and disc.

Lube can also accumulate on both the trailing edge of the slider and in the cavities downstream of the side rails of typical center transducer sliders. When the disc stops, the lube in the cavity will often wick along the rail edges and cause high stiction. Some recording heads use surface energy modifying agents to prevent lubricant from accumulating preferentially on the slider.

On sliders, carbon pads are typically fabricated on the air bearing rails to enhance tribology. These carbon pads are deposited using photolithographic processes.

FIG. 1 shows disc lube 103 accumulating at the trailing edge of a rail 101 of a typical modern slider 100. The air flow 104 in this diagram is generally in an downward direction as the air travels through the air bearing channel 102. The lube tends to preferentially accumulate at the trailing edge of the side rails 101.

FIG. 2 shows a similar situation. In FIG. 2, lube 201 has accumulated in the cavity just down stream of the trailing edge of the air bearing rail 202 of a slider 200, which is just outside the air bearing channel 202. Lube 204 has also accumulated in the area of the interface between the slider substrate and the basecoat/overcoat alumina. This lube accumulation along the alumina can wick along the alumina/substrate edge until it reaches the center pad and then onto the disc. Once the lube reaches the disc/pad interface, it can cause high stiction forces. It is therefore desirable to find a mechanism that controls lube flow across the slider.

SUMMARY

The present invention provides a method and system for reducing accumulated disc lube. More particularly, the present invention relates to a method and apparatus for channeling lube off recording disc head sliders using pads.

Accordingly, the present invention provides a slider for supporting a transducer next to a lubricated recording medium. The slider includes a pad positioned to control a flow of lubricant. The slider can also include a raised rail. The pad can be positioned on the slider between the raised rail and a trailing edge of the slider. The pad can extend to the trailing edge of the slider. The pad can include at least two separated edges, which form a central channel. The pad can be made of carbon. The pads can be approximately 0.03–1.00 micron tall in a cavity that is approximately 2 micron deep. The pad can be angled in relation to an air flow across the slider to control lube.

In another embodiment, the present invention provides a method for fabricating a slider for supporting a transducer next to a lubricated recording medium. The method includes depositing a pad on the slider positioned to control a flow of lubricant. The method can include forming a raised rail. The pad can be deposited between the raised rail and a trailing edge of the slider. The pad can extend to the trailing edge of the slider. The pad can comprise at least two separated edges forming a central channel. The pad can be deposited using photolithographically patterned material. The pad can be made of carbon. The pad can be deposited at an angle in relation to an air flow across the slider to control lube.

The details of one or more embodiments of the invention are set forth in the accompanying drawings and the description below. Implementations can provide advantages such as preferentially controlling accumulation of lubricant at the trailing edge of slider rails. This invention can also be used to prevent wicking of lubricant along the interface between the slider substrate and basecoat or overcoat alumina. The pads can aid in controlling the flow of lubricant off the air bearing surface. The pads can also be used to reduce the flow of the lubricant along the substrate/alumina interface, which can help reduce the resulting stiction.

DETAILED DESCRIPTION

The present invention relates to a method and apparatus for reducing accumulated disc lube. More particularly, the present invention relates to a method and apparatus for channeling lube off recording disc head sliders using pads.

Figure 1:
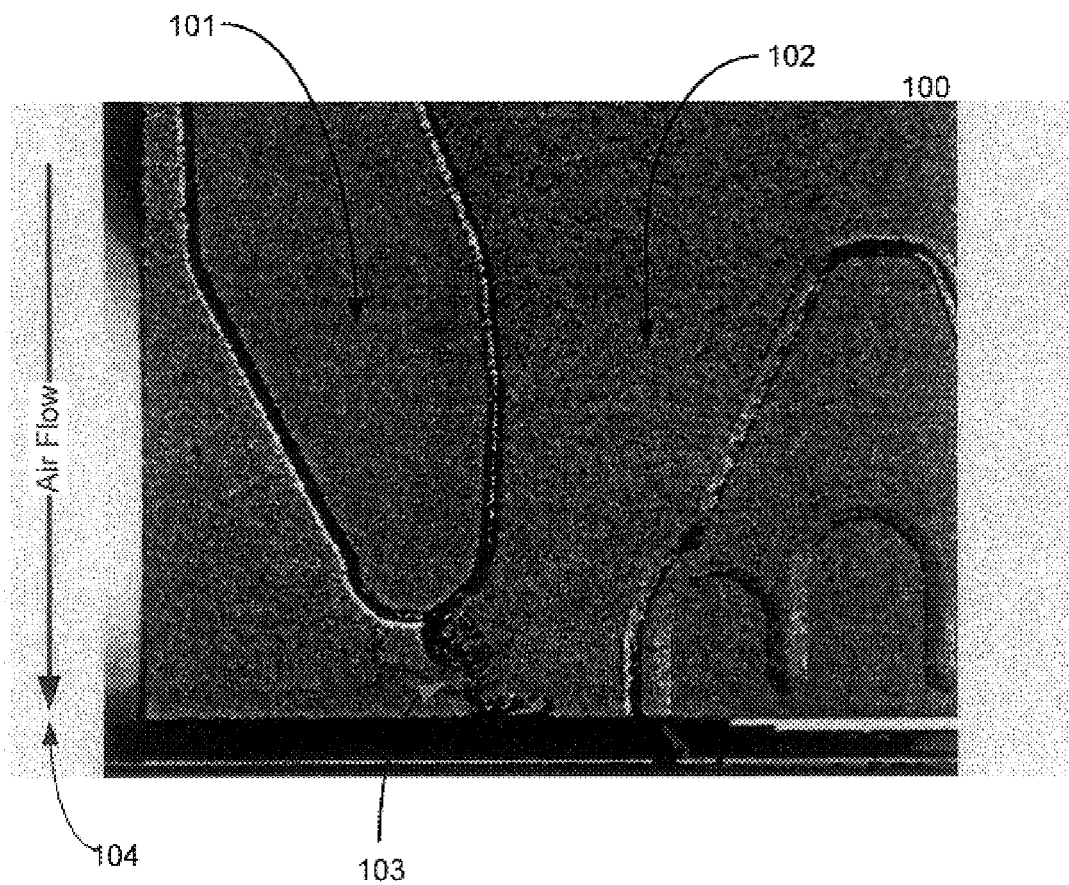
FIG. 1 is a picture of accumulated lube on a slider.
Figure 2:
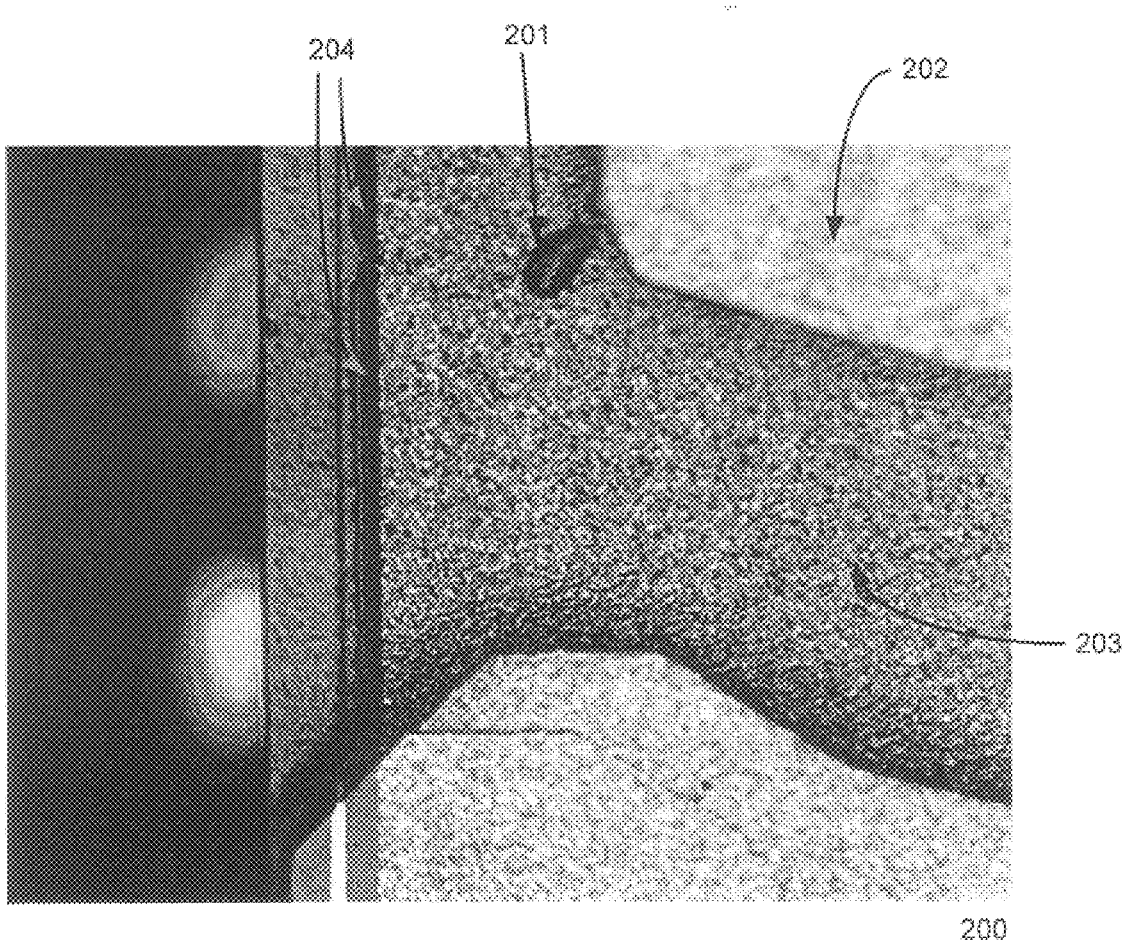
FIG. 2 is a picture of accumulated lube in the area of the interface between the slider substrate and the basecoat/overcoat alumina.
Figure 3:
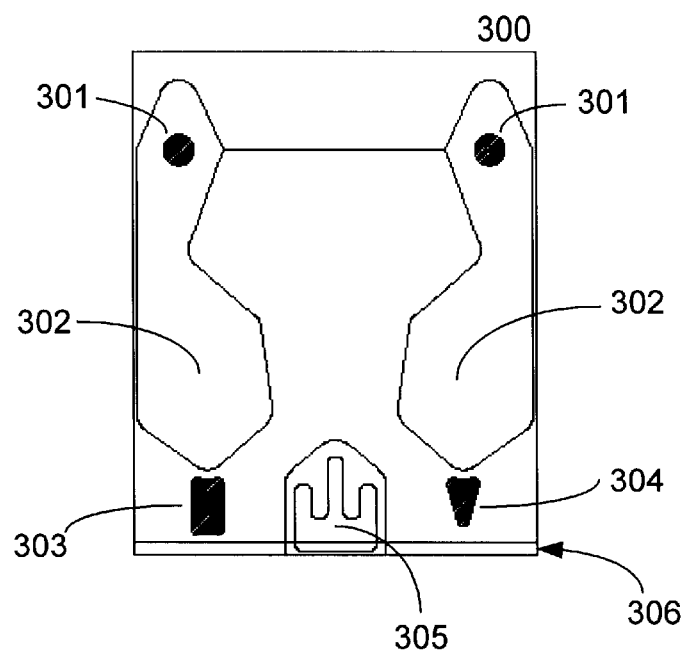
FIG. 3 is an illustration of a top view of a slider with the new pads.

An embodiment of this invention is illustrated in FIG. 3. FIG. 3 shows a top view of a slider 300 with the new features. The circular solid areas resting on the top of the rails 301 are the leading edge discrete carbon pads 301 where the recording media rests. Between the trailing edge 306 and the rails 302 are a pair of pads 303 & 304 around which the lube can preferentially accumulate, or from which the lube can be repelled, depending on the properties of the material. A center pad 305 is also shown. Because the lubricant will adhere at a location near the added pads 303 & 304, its location can be well controlled. Two different pad shapes are shown in FIG. 3. The left pad 303 is shown as a rectangular shape, and the right pad 304 is shown as a triangular shape. Various pad shapes and sizes can be used to optimize the effects of the pad on controlling lube.

Figure 4:
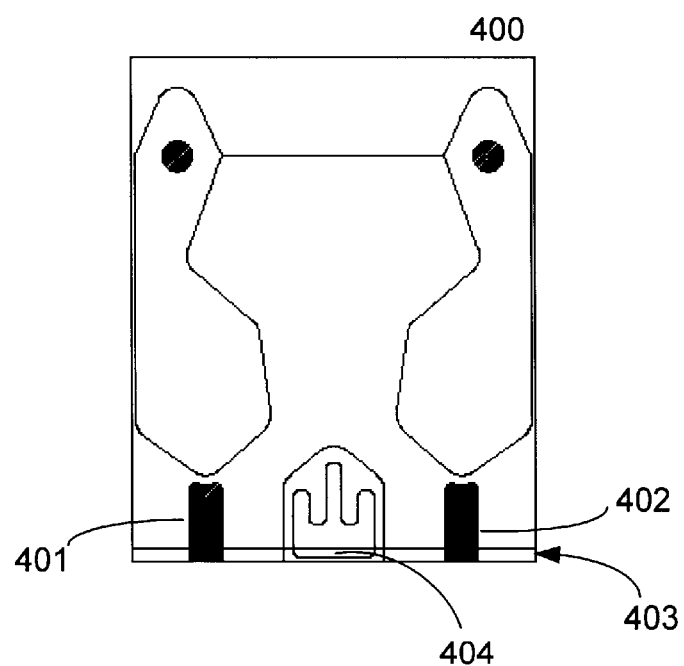
FIG. 4 is an illustration of a top view of a slider with the new pads extended fully to the trailing edge of the slider.

FIG. 4 shows the same basic configuration as in FIG. 3 except that the pads 401 & 402 now extend fully to the trailing edge of the slider 403. This extension of the pads to the trailing edge 403 can result in lube attached to the new pads probably not travelling along the substrate edge toward the center pad 404.

Figure 5:
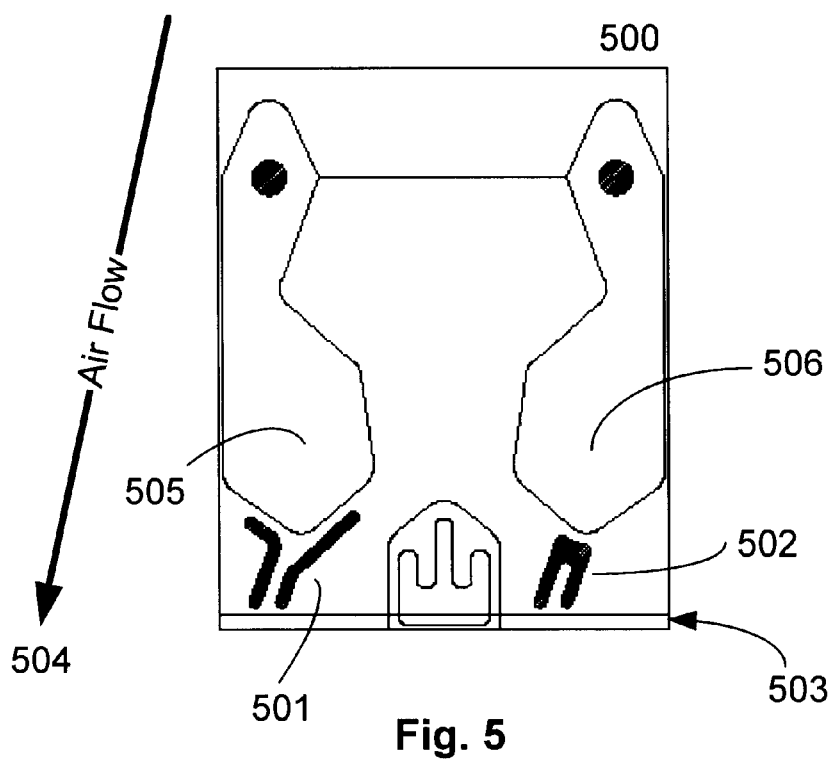
FIG. 5 is an illustration of a top view of a slider with the new pads having a channel.
Figure 6:
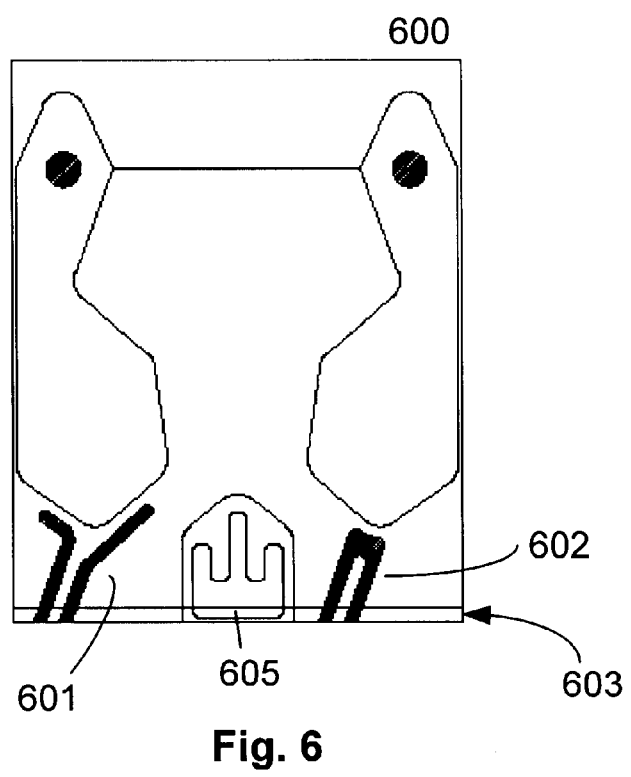
FIG. 6 is an illustration of a top view of a slider with the new pads having a channel and extended fully to the trailing edge of the slider.

In another embodiment, a channel is created into which the lube accumulates. This is shown in FIGS. 5 and 6. In FIG. 5, the right pad 502 is shaped to capture lube coming off of the rail 506. This pad 502 has significantly more perimeter area because of its split design. This may allow better control of lube menisci, which can result in more lube being channeled away. The pad 501 under the left rail 505 may trap lube just as it comes off the rail and preferentially move it toward a central channel to keep it well controlled. The air flow 504 down over the slider can be vertically offset by as much as twenty degrees when the magnetic media is spinning. By changing the angle of the pads 501 & 502 to an angle related to the air flow, better control of the lube may be achieved.

FIG. 6 shows the same basic pad shapes as FIG. 5, but the pads 601 & 602 are extended fully to the trailing edge of the slider 603. This can channel lube away from the trailing edge of the slider 603 and can prevent the lube from migrating across the slider and attaching to the center pad 605.

The slider can be fabricated by forming a raised rail on a slider body. A pad can be deposited on the slider body, positioned between the rail and the trailing edge of the slider. The pad can be fabricated using photolithographically patterned and deposited carbon. Other materials besides carbon can be used to form the pad.

In all cases, the pads are approximately 0.03–1.00 micron tall in a cavity that is approximately 1–3 micron deep. The pads may be thin enough so as not to have an influence on the fly performance of the disc.

Although the present invention has been described with references to preferred embodiments, workers skilled in the art will recognize that changes may be made in form and detail without departing from the spirit and scope of the invention.

What is claimed is:

1. A slider having a trail edge for supporting a transducer proximate to a lubricated recording medium, the slider comprising:

at least one raised air bearing rail that has a trailing edge spaced from the trailing edge of the slider; and a pad, one for each such raised air bearing rails, wherein the pad is positioned adjacent the trailing edge of a raised air bearing rail to control a flow of lubricant off the raised air bearing rail; the pad being sufficiently thin as to not affect the fly performance of the slider, the pad extending to a trailing edge of the slider.

2. The slider of claim 1, wherein the pad is positioned on the slider between the rail and the trailing edge of the slider in the airflow off the rail.

3. The slider of claim 1, further comprising a raised rail, and wherein the pad comprises at least two separated edges forming a central channel.

4. The slider of claim 1, wherein the pad comprises carbon.

5. The slider of claim 1, wherein the pads are approximately 0.03–1.00 micron tall in a cavity that is approximately 2 micron deep.

6. The slider of claim 1, wherein the pad is angled in relation to an air flow across the slider to control lube.

7. The slider of claim 1, wherein the pad is deposited at an angle in relation to an air flow across the slider to control lube.

8. A method for fabricating a slider for supporting a transducer proximate to a lubricated recording medium, the method comprising:

forming at least one air bearing rail that does not extend all the way to the trailing edge of the slider;

depositing a pad on the slider, wherein the pad is positioned adjacent a trailing end of the rail to control a flow of lubricant off the air bearing rail and extends to a trailing edge of the slider; the pad further being sufficiently thin so as to not affect the fly performance of the slider.

9. The method of claim 8, further comprising forming a raised rail, and wherein the pad is deposited on the slider between the rail and the trailing edge of the slider in the airflow off the rail.

10. The method of claim 8, wherein the pad comprises at least two separated edges forming a central channel.

11. The method of claim 8, wherein the pad is deposited using photolithographically patterned material.

12. The method of claim 8, wherein the pad comprises carbon.

13. A slider for supporting a transducer proximate to a lubricated recording medium, the slider comprising:

a raised rail having a back edge;

a pad located between the back edge of the raised rail and a trailing edge of the slider, the pad comprising first and second pad members separated by a channel, the first and second pad members each having a first portion extending generally parallel to the back edge of the raised rail and a second portion extending generally away from the back edge of the raised rail and towards the trailing edge of the slider.

14. The slider of claim 13, wherein the first portions of the first and second pad members extend in generally opposite directions and the second portions of the first and second pad members are substantially parallel, the pad thereby being generally T shaped.

15. The slider of claim 13, wherein the second portion of at least one of the first and second pad members extends to the trailing edge of the slider.

16. The slider of claim 13, wherein the second portions of the first and second pad members are substantially parallel to each other and to a predicted direction of air flow across the slider.

17. A slider for supporting a transducer proximate to a lubricated recording medium, the slider comprising:

a raised rail having a back edge;

a pad located between the back edge of the raised rail and a trailing edge of the slider, the pad being generally U shaped having first and second arm members connected by a transverse member, the transverse member being adjacent and generally parallel to the back edge of the raised rail, the first and second arm members extending generally away from the back edge of the raised rail and towards the trailing edge of the slider.

18. The slider of claim 17, wherein the first and second arm members are substantially parallel to each other.

19. The slider of claim 18, wherein the first and second arm members are substantially parallel to a predicted direction of air flow across the slider.

20. The slider of claim 17, wherein at least one of the first and second arm members extend to the trailing edge of the slider.

* * * * *